US010432998B2

(12) United States Patent
Gerhards et al.

(10) Patent No.: US 10,432,998 B2
(45) Date of Patent: Oct. 1, 2019

(54) ONLINE BACKUP AND RESTORATION OF TELEVISION RECEIVER STORAGE AND CONFIGURATION DATA

(71) Applicant: DISH Technologies L.L.C., Englewood, CO (US)

(72) Inventors: Keith Gerhards, Parker, CO (US); Danny J. Minnick, Castle Rock, CO (US)

(73) Assignee: DISH Technologies L.L.C., Englewood, CO (US)

(*) Notice: Subject to any disclaimer, the term of this patent is extended or adjusted under 35 U.S.C. 154(b) by 180 days.

(21) Appl. No.: 15/068,264

(22) Filed: Mar. 11, 2016

(65) Prior Publication Data

US 2017/0264950 A1    Sep. 14, 2017

(51) Int. Cl.
*H04N 21/4147* (2011.01)
*H04N 21/433* (2011.01)
*H04N 21/472* (2011.01)
*H04N 21/462* (2011.01)
*G06F 11/14* (2006.01)
*H04N 21/41* (2011.01)

(52) U.S. Cl.
CPC ..... *H04N 21/4147* (2013.01); *G06F 11/1448* (2013.01); *H04N 21/4334* (2013.01); *H04N 21/462* (2013.01); *H04N 21/47202* (2013.01); *H04N 21/47214* (2013.01); *H04N 21/4131* (2013.01)

(58) Field of Classification Search
CPC ............. H04N 21/443; H04N 21/4131; H04N 21/4147; H04N 21/4334; H04N 21/462; H04N 21/47202; H04N 21/47214; H04N 21/64322

USPC .......................................... 386/297, 296, 295
See application file for complete search history.

(56) References Cited

U.S. PATENT DOCUMENTS

| | | | | |
|---|---|---|---|---|
| 6,020,880 A | * | 2/2000 | Naimpally | H04N 7/163 348/E7.061 |
| 8,745,666 B1 | * | 6/2014 | Zaveri | H04N 21/2407 725/14 |
| 9,712,861 B1 | * | 7/2017 | Milne | H04N 21/4147 |
| 2002/0042921 A1 | * | 4/2002 | Ellis | G06F 3/0481 725/87 |
| 2007/0172196 A1 | * | 7/2007 | Kusunoki | H04N 5/782 386/297 |

(Continued)

*Primary Examiner* — Helen Shibru
(74) *Attorney, Agent, or Firm* — Kilpatrick Townsend & Stockton LLP

(57) ABSTRACT

Embodiments described herein provide various techniques for backing up and restoring data and programs at television receiver devices. In some embodiments, various types of data stored locally by television receiver devices may be backed up by uploading the data to a television provider server, cloud-based storage system, and/or other remote storage locations. In the event of a device failure, or other rebuilt or reinstallation process at the television receiver, a receiver set-up process may be implemented to retrieve the receiver backup data from the backup server, and to initiate various set-up processes in which the replacement receiver may use the backup data to implement the various configuration preferences and settings on the new device, re-create the DVR timers, establish new network connections, configure the home device/appliance settings, and the like, automatically based on the receiver backup data.

20 Claims, 9 Drawing Sheets

(56) References Cited

U.S. PATENT DOCUMENTS

| | | | |
|---|---|---|---|
| 2009/0010613 A1* | 1/2009 | Murakami | G11B 20/20 386/238 |
| 2009/0042607 A1* | 2/2009 | Adachi | H04H 20/40 455/556.1 |
| 2009/0172046 A1* | 7/2009 | Kodama | G06F 11/1451 |
| 2009/0254966 A1* | 10/2009 | Josephs | H04N 7/17318 725/140 |
| 2012/0331050 A1* | 12/2012 | Wilbur | G06F 9/5072 709/204 |
| 2013/0055312 A1* | 2/2013 | Cheng | H04N 21/4325 725/49 |
| 2013/0066836 A1* | 3/2013 | Weiss | G06F 11/1466 707/646 |
| 2013/0311918 A1* | 11/2013 | McCoy | G06F 8/38 715/765 |
| 2017/0118531 A1* | 4/2017 | Medina | H04N 21/64707 |
| 2017/0142643 A1* | 5/2017 | Dang | H04W 8/06 |
| 2017/0195401 A1* | 7/2017 | Shin | H04L 67/02 |
| 2017/0262182 A1* | 9/2017 | Milne | G06F 3/065 |

* cited by examiner

Receiver Set-Up: Restoring Your Recorded Programs
The Following Programs Are Available
For Immediate Download/Viewing:

| Program Title | TV Data Source | Cost | |
|---|---|---|---|
| Action Movie ABC | On-Demand | FREE! | Download |
| Science Documentary | On-Demand | $0.99 | Download |
| Kiss The Chef (Movie) | Cloud Server | $2.99 | Download |
| Political Drama (Ep. 2-8) | Streaming Service | FREE! | Watch Now |
| Romantic Comedy XYZ | Streaming Service | $1.99 | Watch Now |

FIG. 8

ONLINE BACKUP AND RESTORATION OF TELEVISION RECEIVER STORAGE AND CONFIGURATION DATA

BACKGROUND OF THE INVENTION

The advent of the digital video recorder and the availability of high-capacity and affordable computer-readable storage devices have made available many possibilities for television programming service providers and viewers alike. Television viewers have come to expect flexibility and convenience with respect to the recording and/or accessing of content via their television receivers.

BRIEF SUMMARY OF THE INVENTION

Aspects described herein provide various techniques for backing up and restoring data and programs at television receiver devices. In some embodiments, television receivers may receive and store various types of data and media files via interactions with users and television provider services. Such data may include configuration settings and preferences, parental control and secure access data, digital video recorder (DVR) timers, and the recorded television programs and other media files stored locally in the memory of the receiver. Additional examples of data maintained by television receivers may include home automation settings, home device/appliance status data, home security configuration data, and wireless network connectivity data. Some or all of the various types of data stored locally by a television receiver device may be backed up by uploading the data to a television provider server, cloud-based storage system, and/or other remote storage locations. In the event of a device failure of the television receiver, a new replacement device may be configured to retrieve the television receiver backup data from the backup server, and to initiate various set-up processes in which the replacement receiver may use the backup data to implement the various configuration preferences and settings on the new device, re-create the DVR timers, establish new network connections, configure the home device/appliance settings, and the like, automatically based on the receiver backup data.

In certain embodiments described herein, television programs (and/or other media files) recorded and stored in the memory of the receiver might not be transmitted to a backup server. Often, such programs may be very large and uploading to a backup server may be prohibitive in terms of storage space and/or upstream channel network bandwidth. In such cases, the television receiver may upload data to one or more backup servers identifying a listing of programs stored locally on the receiver, without uploading/backing up the programs themselves. A replacement television receiver may retrieve the data identifying the programs, and may attempt to restore some or all of the programs to the replacement device from various television data sources. For example, the replacement receiver may search electronic program guide (EPG) data to identify upcoming broadcasts from which one or more of the programs may be restored. Additionally or alternatively, the replacement receiver may determine that certain programs may be restored from on-demand television sources and/or Internet-based television sources. In some embodiments, the replacement television receiver may be configured to generate and output graphic interfaces to allow users to request restoration of specific programs from the various television data sources.

BRIEF DESCRIPTION OF THE DRAWINGS

The present invention is described in conjunction with the appended figures:

FIGS. 7-8 are illustrative user interface screens relating to television receiver set-up and/or program recovery processes, according to one or more embodiments of the disclosure.

Figure 1:
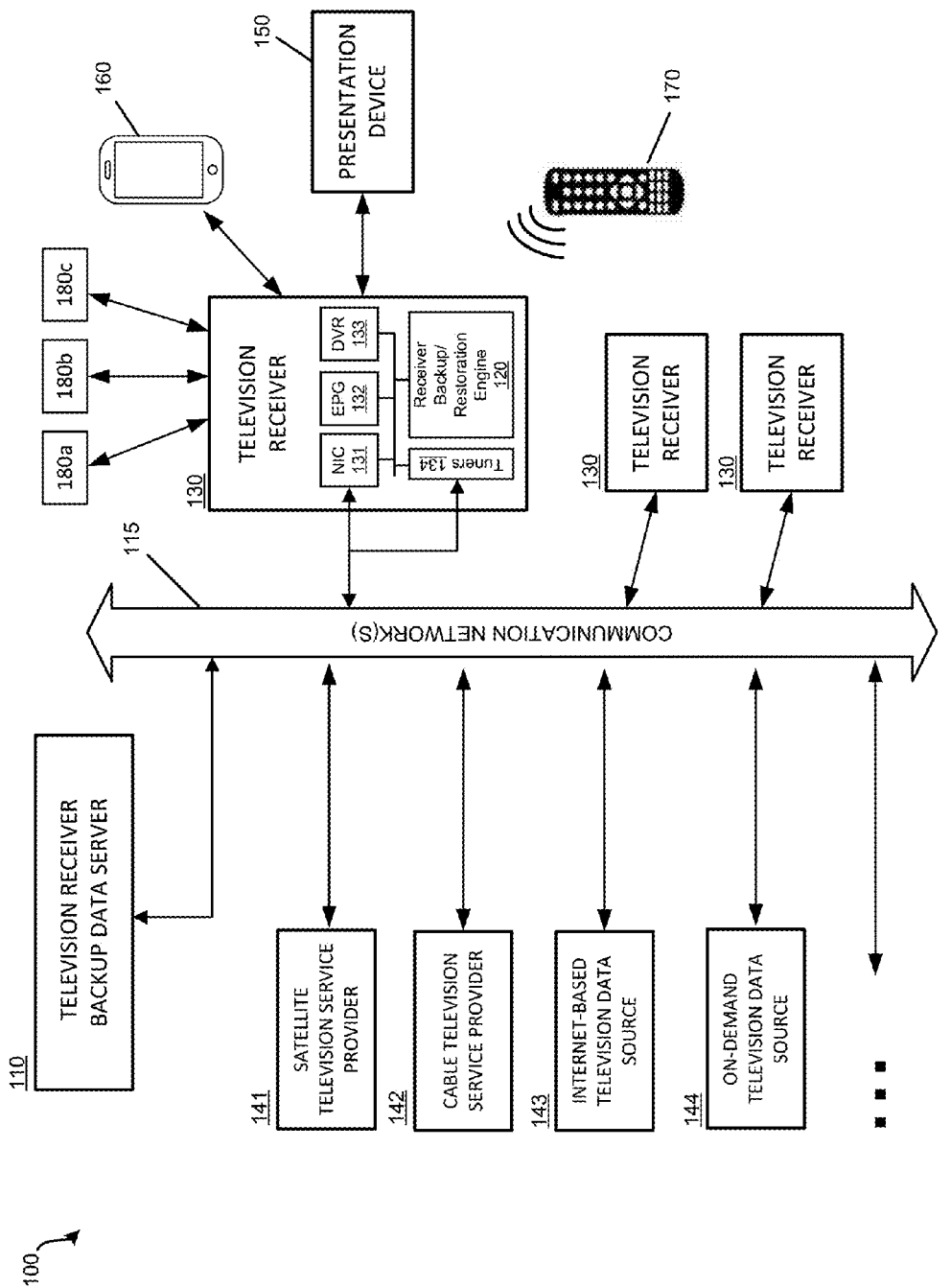
FIG. 1 is a block diagram illustrating an embodiment of a television distribution system, according to one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for backing up and restoring data and programs at television receiver devices. In some embodiments, television receivers may receive and store various types of data and media files via interactions with users and television provider services. Such data may include configuration settings and preferences, parental control and secure access data, digital video recorder (DVR) timers, and the recorded television programs and other media files stored locally in the memory of the receiver. Additional examples of data maintained by television receivers may include home automation settings, home device/appliance status data, home security configuration data, and wireless network connectivity data. Some or all of the various types of data stored locally by a television receiver device may be backed up by uploading the data to a television provider server, cloud-based storage system, and/or other remote storage locations.

In the event of a device failure of the television receiver, a new replacement device may be configured to retrieve the television receiver backup data from the backup server, and to initiate various set-up processes in which the replacement receiver may use the backup data to implement the various configuration preferences and settings on the new device, re-create the DVR timers, establish new network connections, configure the home device/appliance settings, and the like, automatically based on the receiver backup data.

In certain embodiments described herein, television programs (and/or other media files) recorded and stored in the memory of the receiver might not be transmitted to a backup server. Often, such programs may be very large and uploading to a backup server may be prohibitive in terms of storage space and/or upstream channel network bandwidth. In such cases, the television receiver may upload data to one or more backup servers identifying a listing of programs stored locally on the receiver, without uploading/backing up the programs themselves. A replacement television receiver may retrieve the data identifying the programs, and may attempt to restore some or all of the programs to the replacement device from various television data sources. For example, the replacement receiver may search electronic program guide (EPG) data to identify upcoming broadcasts from which one or more of the programs may be restored. Additionally or alternatively, the replacement receiver may determine that certain programs may be restored from on-demand television sources and/or Internet-based television sources. In some embodiments, the replacement television receiver may be configured to generate and output graphic interfaces to allow users to request restoration of specific programs from the various television data sources.

The various embodiments described herein may be implemented on and within one or more different networks and systems, including satellite or terrestrial television distribution systems, telecommunications network systems, television distribution computer networks such as the Internet, cellular and other mobile networking systems, and the like. Therefore, although certain examples below are described in terms of specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, on-demand distribution networks, Internet television computer networks), as well as other user equipment and devices (e.g., personal computers, servers, routers, gaming consoles, smartphones, etc.).

Referring now to FIG. 1, an example television receiver backup and restoration system 100 is shown on which various aspects of the present disclosure may be implemented. In this example, the television receiver backup/restoration system 100 includes one or more television receivers 130 configured to receive television content from a plurality of television data sources 141-144, as well as television receiver backup data server 110 to provide online backup and restoration of data and programs to the television receiver 130. As discussed below, in some embodiments, television receivers 130 may support various functionality to implement the television viewing preferences and settings of users, to set timers and record television programs, to provide wireless network capabilities, to monitor home devices, and to perform various other tasks. For each of these tasks, the television receiver 130 may store specific types of configuration data, device settings, and/or files within the storage systems of the receiver 130. As described below in more detail, some or all of these data may be backed up by uploading the data to the backup server 110, and, in the event of a receiver failure and/or installation of a replacement receiver device, the appropriate backup data may be retrieved from the backup server 110 and used in various processes to set-up and configure the replacement receiver. In some embodiments, the television programs (and/or other media files) stored locally on a receiver device 130 might not be uploaded to the backup server 110. However, data identifying these programs may be uploaded as backup data, and the replacement receiver may use this backup data to and restore the programs from one or more television data sources 141-144.

In order to perform these features and the additional functionality described below, each of the components and sub-components shown in example system 100, such as television receiver 130, backup server 110, television data sources 141-144, presentation device 150, user computing device 160, etc., may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication network 115 (as well as other communication networks 115 not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the data sources 141-144, television receiver 130, backup server 110, and other components within television receiver backup/restoration system 100.

Television receivers 130 may be implemented using various specialized user equipment devices, such as cable system set-top boxes, satellite system set-top boxes, WiFi or Internet-based set-top boxes, gaming consoles, and the like. In other examples, television receivers 130 may be implemented using (or integrated into) other computing devices such as personal computers, network routers, tablet computers, mobile devices, etc. Thus, a television receiver 130 may be implemented as a single computing device or a computing system including a combination of multiple computing devices, storage devices, network components, etc. In some examples, a television receiver 130 may correspond to a primary television receiver (PTR) 210 including one or more network interface components (NICs) 131, an electronic programming guide (EPG) user interface component 132, a digital video recorder (DVR) 133, and a plurality of tuners 134 and related hardware/software components (e.g., audio/video decoders, descramblers, demultiplexers, etc.) as described below in more detail in FIGS. 2-3. In some cases, television receivers 130 may include one or more internal data stores and/or external data stores (e.g., external storage systems, database servers, file-based storage, cloud storage systems, etc.) configured to store television programs (e.g., audio/video files corresponding to television shows or movies, sporting events, live broadcasts, etc.), as well as image data and music/audio content that may be stored on television receivers 130 and output via presentation devices 150. In some embodiments, such data stores may reside in a back-end server farm, storage cluster, and/or storage-area network (SAN). As shown in this example, a receiver backup and restoration engine 120 also may be implemented within the television receiver 130 to perform various functionality and communications relating to online backup and restoration of the television receiver data, including collecting and uploading television viewer configuration settings and preferences, recording timers, program data, network and home monitoring data, and the like, as well as retrieving and using the backup data during replacement receiver installations and receiver recovery/restoration processes, as described in more detail below.

As shown in this example, the television receivers 130 may be configured to communicate with one or more television data sources 141-144 over one or more communication networks 115. In various embodiments and implementations, television data sources 141-144 may include, for example, one or more satellite television service/content providers 141, one or more cable television service/content providers 142, one or more Internet-based television service/content providers 143, and one or more on-demand television service/content providers 144. Although four example television data sources 141-144 are shown in FIG. 1, it should be understood that these examples are illustrative only and non-limiting, and that any number of different television data sources may be used in other embodiments. Additionally, although the television receivers 130 and television content data sources 141-144 are each illustrated as standalone computer systems in this example, as discussed below, these components may be implemented within and/or integrated into one or more servers or devices of various content distribution systems and other computing architectures. For example, as discussed below in reference to FIGS. 2 and 3, the receiver backup and restoration engine 120 may be implemented solely within a television receiver 130, or may be implemented within a combination of devices of a satellite television distribution system 200 or other television receiver backup/restoration system 100. For example, the receiver backup and restoration engine 120 may be implemented via one or more backup/restoration mode services 220 operating within servers 218 and/or television receivers 210 and 212 within a satellite television distribution system 200. In other embodiments, the receiver backup and restoration engine 120 may be implemented similarly, as a standalone component and/or in a distributed manner, within other types of content distribution systems, such as terrestrial television distribution systems, telecommunications network systems, LAN or WAN computer networks (e.g., the Internet), cellular and other mobile networking systems, and any other computing environment configured to provide live content. In any of these examples, the receiver backup and restoration engine 120 may be implemented within (or integrated into) television receivers 130 as shown in FIG. 1, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television content received and/or recorded by a television receiver 130 may be presented via one or more presentation devices 150. Presentation devices 150 may correspond to televisions and other television viewing devices (e.g., home computers, tablet computers, smartphones, etc.). Additionally, various television receiver backup/restoration systems 100 may incorporate other user equipment and devices, such as user devices 160 and remote control devices 170 configured to communicate with associated television receivers 130 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 130 and/or specific user accounts of television receiver backup/restoration systems 100. As shown in FIG. 1, user devices 160 may be configured to receive data from and transmit data to an associated television receiver 130. Additionally or alternatively, user devices 160 may be configured to communicate directly with one or more television data sources 141-144 and/or backup servers 110, so that certain transmissions of television content and other functionality (e.g., reviewing and updating receiver backup data, backup settings, etc.) may potentially bypass the television receiver 130 in some embodiments.

Different presentations devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television receiver 130, or data sources 141-144 may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 170 selected to output the notification. Additionally, in some cases, users may establish user-specific preferences, which may be stored in the memory of the television receiver 130, for outputting specific types of user notifications to specific types of presentation devices 150 and/or user devices 160.

Sensor devices 180a-180c (which may be referred to collectively or individually as sensor device(s) 180) may include computer systems and other electronic devices configured to monitor conditions and physical locations and/or operational status of various electronic devices, and transmit the corresponding sensor data to one or more receiver systems, which may include television receivers 130 and/or user devices 160. For example, sensors devices 180 may include any or all of the in-home or on-residence home automation-related devices and systems 180 discussed below in reference to FIG. 4, such as security systems, home appliances, utility monitors, etc.

The television receivers 130, backup servers 110, television data source devices or servers 141-144, presentation devices 150, and user devices 160 each may include the necessary hardware and software components to establish network interfaces and transmit/receive television signals or data streams, television receiver backup/restoration data, user notifications, etc. Some or all of these devices may include security features and/or specialized hardware (e.g., hardware-accelerated SSL and HTTPS, WS-Security, firewalls, etc.) in order to prevent hacking and other malicious access attempts within the system 100. In some cases, the television receivers 130 may communicate with backup servers 110, television data sources 141-144, and/or user devices 160 using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the television receivers 130, backup servers 110, data sources 141-144, and user devices 160. SSL or TLS may use HTTP or HTTPS to provide authentication and confidentiality.

Communication network(s) 115, through which the television receivers 130, backup servers 110, television data sources 141-144, and/or user devices 160 may communicate, may include local area networks (LANs), wide area networks (WANs) (e.g., the Internet), and/or various wireless telecommunications networks. For example, when a receiver backup and restoration engine 120 is implemented within a television receiver 130, wireless router, modem, or other local user equipment, then communication network 115 may include wireless local area networks (WLANs) or other short-range wireless technologies such as Bluetooth®, mobile radio-frequency identification (M-RFID), and/or other such communication protocols. In other examples, when at least a portion or component of a receiver backup and restoration service 220 is implemented remotely at a central server, satellite hub, cable headend, or the like, then communication network 115 may include one or more WANs (e.g., the Internet), satellite communication networks, or terrestrial cable networks, and various cellular and/or telecommunication networks (e.g., 3G, 4G or EDGE (enhanced data rates for global evolution), WiFi (IEEE 802.11 family standards, or other mobile communication technologies), or any combination thereof. Additionally, for communication between mobile user devices 160 located remotely to their associated television receivers 130, then communication may include use of WANs, satellite networks, terrestrial cable networks, and/or cellular or other mobile telecommunication networks, etc.

As discussed above, various components of the television receiver backup/restoration system 100 may be implemented as standalone hardware and software systems, and may be implemented within one or more different computer network systems and architectures. For example, in reference to FIGS. 2 and 3, the television receiver backup/restoration system 100 may be implemented using one or more receiver backup/restoration services 220 executing within server hardware 218 and/or television receiver devices 210 within a satellite television distribution system 200. However, in other embodiments, the components of a television receiver backup/restoration system 100 may be incorporated within various different types of content distribution systems. For example, corresponding embodiments to those described in FIGS. 2 and 3 may be implemented within terrestrial cable television distribution systems, telecommunications network systems, LAN or WAN computer networks (e.g., the Internet), cellular and other mobile networking systems, and the like. In any of these examples, a television receiver backup/restoration system 100 may be implemented within (or integrated into) one or more content servers (e.g., satellite hubs, cable head ends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services. Thus, although not so limited, an appreciation of various aspects of the present disclosure may be gained from the following discussion in connection with FIGS. 2 and 3.

Figure 2:
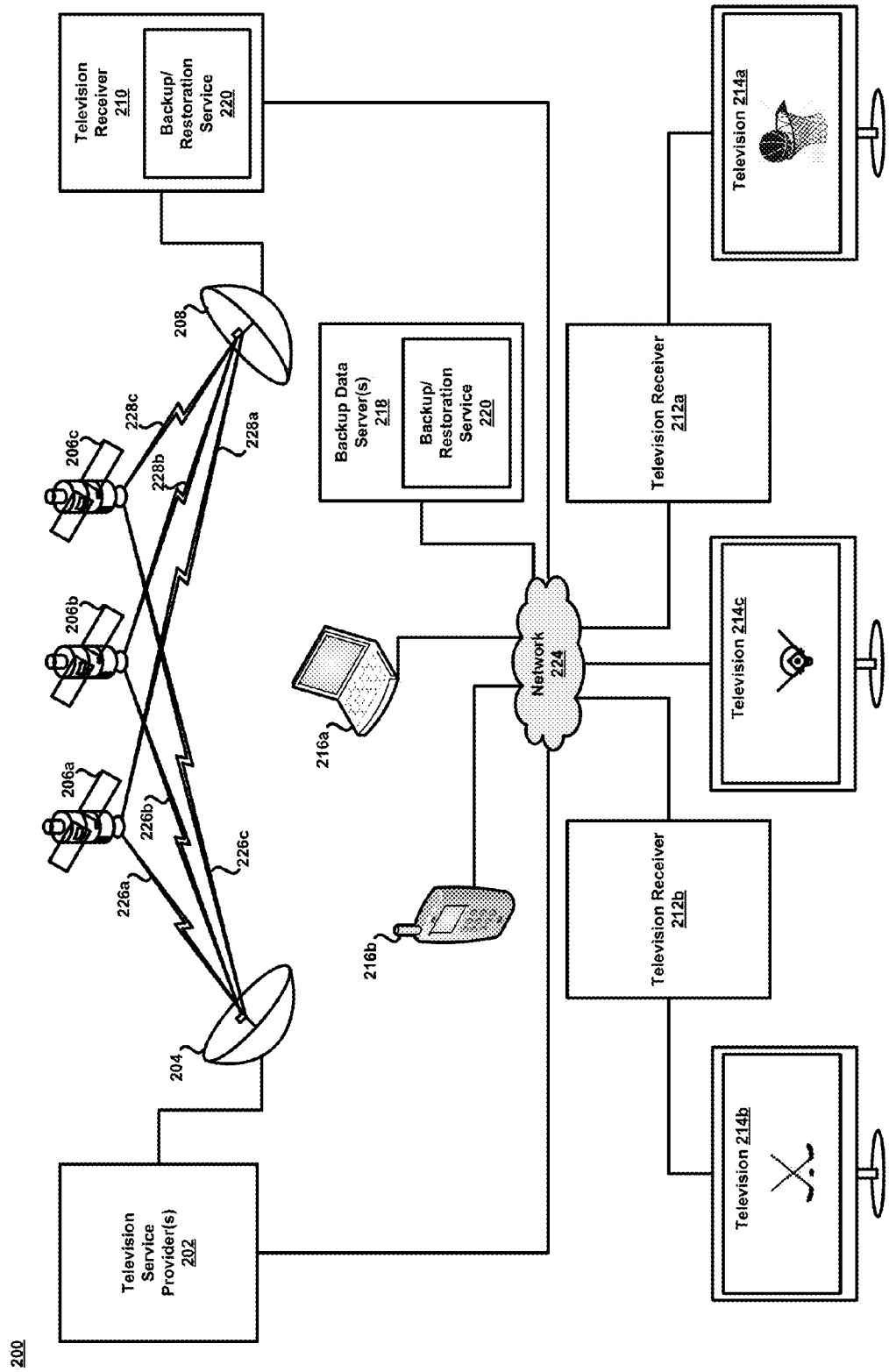
FIG. 2 is a block diagram illustrating an example satellite television system, according to one or more embodiments of the disclosure.

Referring now to FIG. 2, an example satellite television distribution system 200 is shown in accordance with the principles of the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include one or more service providers 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may in general be associated with or operated by or implemented by the service providers 202. Additionally, the PTR 210 and/or the server 218 may include or otherwise exhibit an instance of receiver backup/restoration service module 220. The receiver backup/restoration module 220 may be implemented and configured using various hardware and software components discussed above, in order to support the features and perform the functionality of the various television receiver backup/restoration systems 100 discussed above in reference to FIG. 1. Thus, receiver backup/restoration service modules 220 in this embodiment may be configured to, for example, collect and upload television viewer configuration settings and preferences, recording timers, program data, network and home monitoring data, and the like, to one or more receiver backup servers 110. Additionally, receiver backup/restoration service modules 220 may be configured to retrieve backup data from backup servers 110 and use the backup data during replacement receiver installations and/or receiver repair/recovery processes, as described in more detail below The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212a-b, as described throughout may generally be any type of television receiver, television converter, etc., such as a set-top box (STB) for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
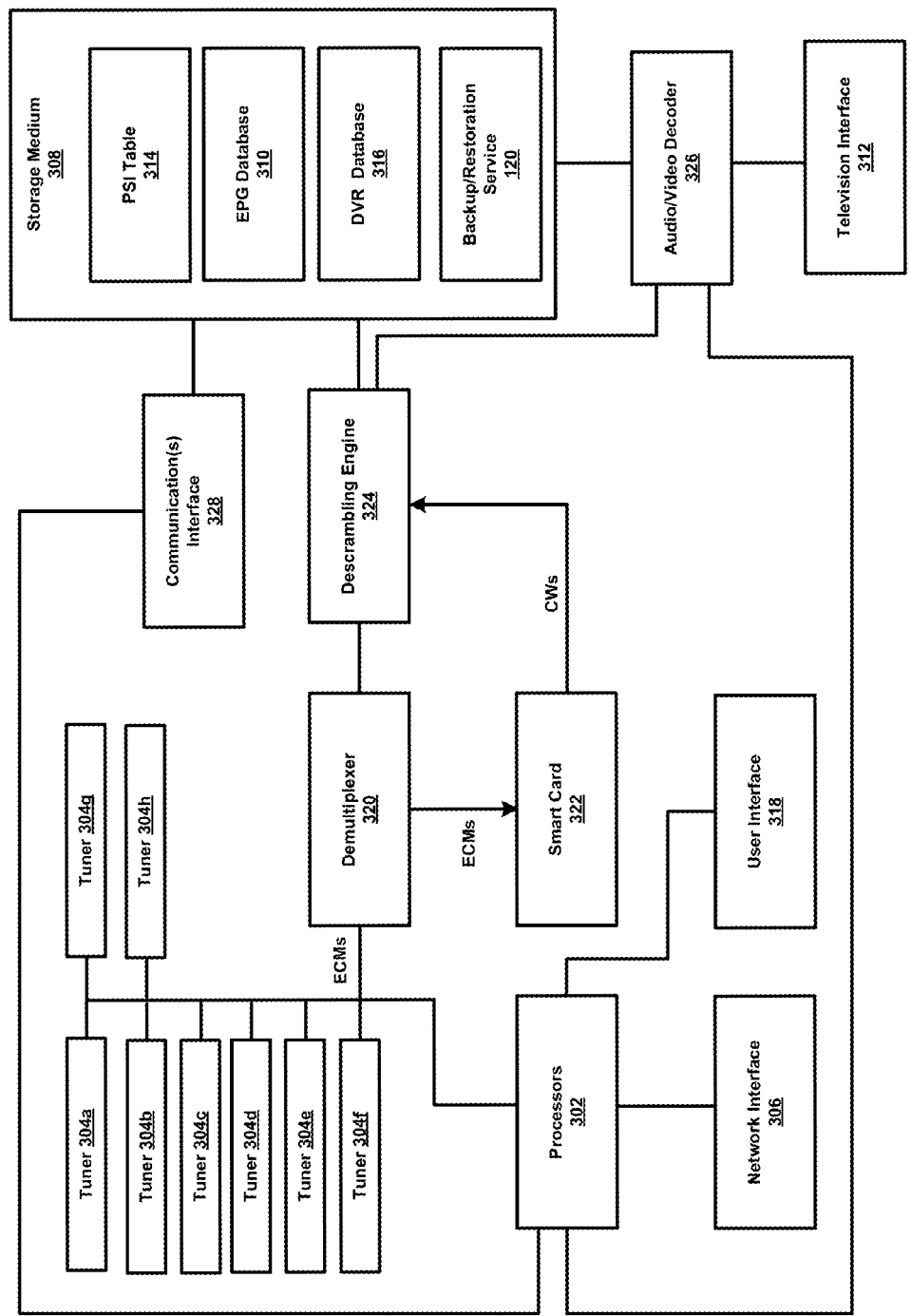
FIG. 3 is a block diagram illustrating an example television receiver device, according to one or more embodiments of the disclosure.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between a service provider 202 of FIG. 2 and the PTR 210 may be via satellites 206a-c, which may be unidirectional to the PTR 210, and another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the receiver backup and restoration engine 120 discussed above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4       | 1         | 2           | 27      | 2001       | 1011      |
| 5       | 2         | 11          | 29      | 2002       | 1012      |
| 7       | 2         | 3           | 31      | 2003       | 1013      |
| 13      | 2         | 4           | 33      | 2003, 2004 | 1013      |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing systems and devices as shown in FIG. 2 and FIG. 3, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 3, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 9.

For brevity, the PTR 210 is depicted in a simplified form, and may generally include more or fewer elements or components as desired, including those configured and/or arranged for receiving and analyzing television program recording schedule data and live television broadcast data, and for determining and implemented updated recording schedules, in accordance with the principles of the present disclosure. For example, the PTR 210 is shown in FIG. 3 to include an instance of the receiver backup/restoration engine 120 as mentioned above in connection with FIG. 1. In other examples, the PTR 210 may include a receiver backup/restoration service 220, as shown above in FIG. 2, that is configured to communicate with a corresponding service 220 in a backup server 218. While shown stored to the storage medium 308 as executable instructions, a receiver backup/restoration engine 120 (and/or service 220) could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
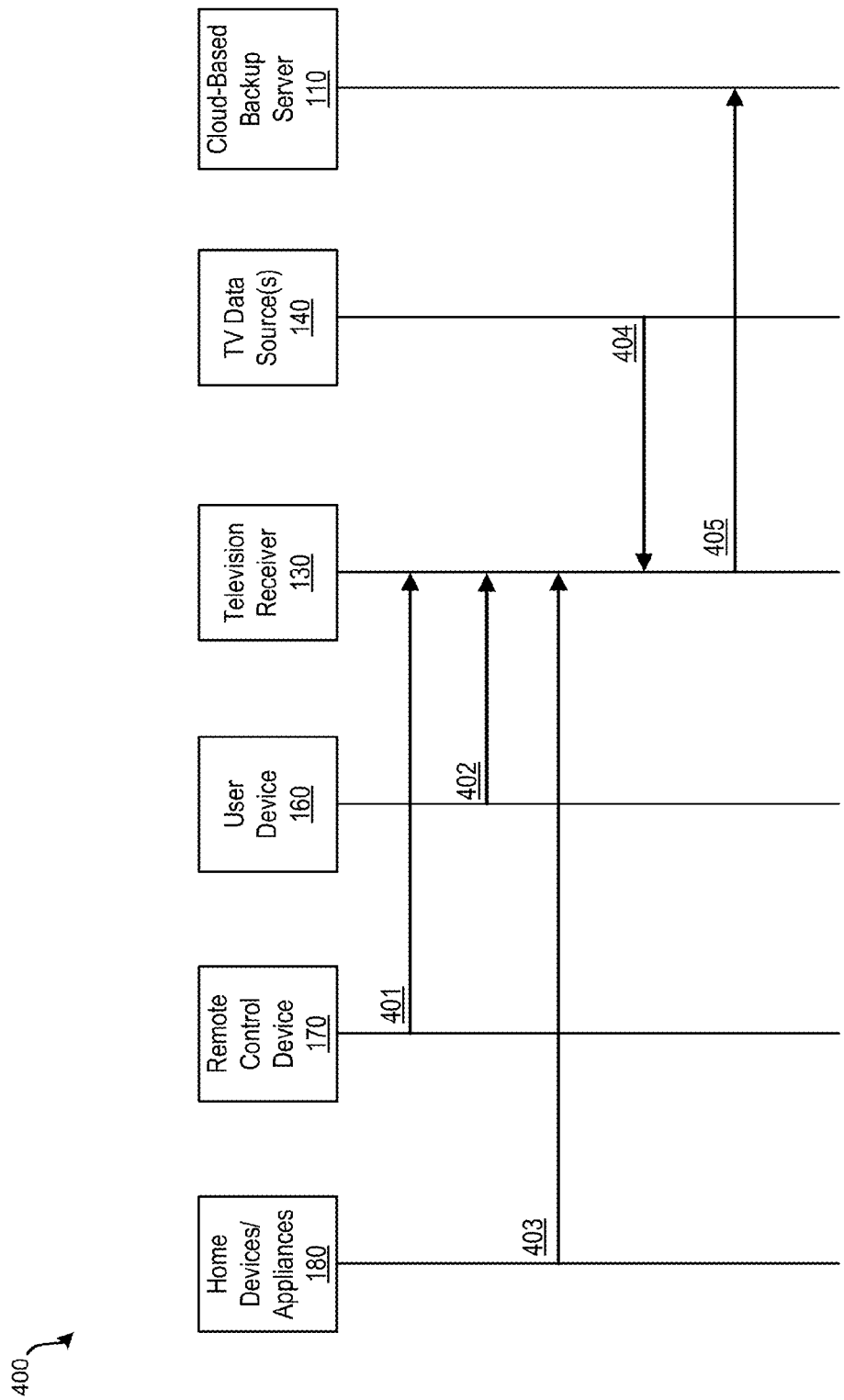
FIG. 4 is an example sequence diagram illustrating a process of television receiver data backup, according to one or more embodiments of the disclosure.

Referring now to FIG. 4, a sequence diagram is shown illustrating an example process of collecting and backing up various television receiver data to a cloud-based backup server. As described below, the steps in this process may be performed by one or more components in the television receiver backup/restoration system 100 and other related systems and components described above. For example in some cases, a television receiver 130 (e.g., primary receiver 210) may perform the steps shown in FIG. 4, operating autonomously or in communication with one or more home devices/appliances 180, remote control devices 170, user devices 160, television data sources 440 (e.g., servers 202), and backup computer servers 110, etc. In other cases, different combinations of devices may be used to perform the steps described below. Additionally, it should be understood that the techniques described herein for collecting and backing up television receiver data need not be limited to the specific systems and hardware implementations described above in FIGS. 1-3, but may be performed within other computing environments comprising other combinations of hardware and software components. For example, this example process may be implemented not only using cloud-based backup servers 110, but also using backup servers associated with television service providers, third-party backup storage services, local (e.g., home computer-based) backup devices, and the like. Moreover, although diagram 400 is shown as a process of sequential steps 401-405, certain steps may be optional or may occur repeatedly, and the sequence of steps 401-405 may occur in various different orders.

In steps 401 and 402, the television receiver 130 may interact with and receive data from a remote control device 170 (step 401) and/or a user device 160 (step 402). The data received in steps 401 and 402 may include any of the various different types of configuration data, settings, and user preferences supported by the television receiver 130. For example, television viewers may use remote controls 170 or other user devices 160 to configure a home television receiver 130 to create digital video recorder (DVR) program recording timers, establish viewing preferences, and set-up favorite channel lists. Devices 160 and/or 170 also may be used to create passcode security for restricted channels or restricted content types, create parental control rules, set-up time-based, content-based, and/or channel-based viewing restrictions, and the like. Additionally, devices 160 and/or 170 may be used to configure the television receiver 130 to connect to one or more wireless networks available at the receiver's location 130. Devices 160 and/or 170 also may be used to configure the receiver with respect to any home monitoring and/or home security functions performed using data from home devices/appliances 180. For example, a user may login to a receiver-based home monitoring or home security service or application via a mobile device 160, in order to activate or deactivate the home monitoring or home security system, activate or deactivate specific home devices/appliances 180, configure specific home devices/appliances 180 to send particular status data and device usage data at particular time intervals, and the like. Some or all of these various types of configuration data, settings, and user preferences, may be received by the television receiver 130, and stored within the local device memory of the receiver, in steps 401 and 402.

In step 403, home devices/appliances 180 may transmit device status data, device usage data, event logs, and the like to the television receiver 130. As described above, home devices/appliances 180 may include sensor devices, detectors, appliances, and various computer systems and other electronic devices configured to monitor conditions and physical locations and/or operational status of various electronic devices, and transmit the corresponding sensor data to the television receiver 130. In some cases, devices 180 may operate in conjunction with a television receiver-based system (or other in-home or on-residence home automation-related systems), such as a home security system, home utility monitor system, home appliance monitor system, etc. Devices 180, including appliances and sensors, may be configured independently or via instructions transmitted by the television receiver 130 or a user device 160, to detect and transmit device status data, device usage data, detected sensor data, alarm data, event log data, etc., to the television receiver 130 (either directly or through one or more intermediary devices 160. Any number of different types of devices 180 may be implemented and configured to transmit various data to the television receiver 130 in step 403, including but not limited to security cameras, personal health/fitness monitors, intercoms, light controller devices, programmable thermostats, doorbell sensors, pet door sensors/controllers, pet feeder devices, window sensors, smoke detectors, carbon monoxide detectors, door sensors, indoor or outdoor weather sensors, home security systems, shade controllers, utility monitors, lock controllers, irrigation controllers, garage door controllers, home appliance controllers, leak detection sensors, routers, modems, and any other home/work appliances, sensors, or devices. In step 403, the television receiver 130 may receive and store the operational status data, usage data, etc., from one or more such devices 180, within the local device memory of the receiver 130.

In step 404, the television receiver 130 may receive a number of television programs from various different television data sources 140. As discussed above, during the operational lifetime of a television receiver 130, the receiver 130 may receive and store various television programs from one or more satellite television service/content providers 141, cable television service/content providers 142, Internet-based television service/content providers 143, and/or on-demand television service/content providers 144. As used herein, television programs may include, for example, video files and/or audio files corresponding to television shows or movies, live television broadcasts, sporting events, and concerts, etc. Television receivers 130 also may store music files, image data, gaming software applications, and any other media files capable of being stored by the television receiver 130 and output to one or more presentation devices 150. In some cases, step 404 may include the receiver 130 receiving and recording television programs from satellite and/or cable television broadcast streams, using tuners 304 and related components, based on user-programmed DVR recording timers. Additionally or alternatively, step 404 may include receiver 130 downloading on-demand media content from an Internet-based television provider 143 via a network interface 306, and/or on-demand television programs from an on-demand television data source 144. In step 404, the television receiver 130 may receive and store the various television programs within a DVR database 316 or other media data store, using a local hard drive or other storage system/device of the receiver 130.

In step 405, the television receiver 130 may backup some or all of the data received in steps 401-404, by transmitting the data to a cloud-based backup server 110. As noted above, the backup server 110 in this example is a cloud server, in other examples the backup server 110 may be a computer server 110 maintained by a television provider, a third-party backup storage service 110, and/or a local backup device 110 (e.g., a home computer, external drive with wireless connectivity, etc.). Thus, step 405 may include the television receiver 130 establishing an upstream connection to one or more backup servers 110 (e.g., via cable, satellite, and/or computer networks), and then transmitting to the backup servers 110 identifying information associated with the receiver 130 (e.g., a receiver device identifier or serial number, a user name, a user account number, etc.), along with the configuration data, settings, and user preferences data received in steps 401-402, the home device/appliance data received in step 403, and/or the television programs received in step 404.

In some embodiments, the television receiver 130 might not transmit certain types of the backup data received in steps 401-404 to the backup server 110. For example, as discussed above, the television program content received from data sources 140 in step 404 may include large files which may be difficult and/or costly to transmit to the backup server 110. For instance, depending on the upstream bandwidth limitations or other upstream data transmission restrictions imposed by the communication network 115, the television receiver 130 might not transmit some or all of the actual television program files/content during the receiver data backup process 400. In such cases, the receiver 130 might only transmit data identifying the television programs stored in the memory of the receiver 130, rather than transmitting the television programs themselves. For instance, the receiver 130 in step 405 may transmit a listing of television programs that contains identifying data (e.g., program names, program identifiers, channels, duration, size, etc.) for each television program stored in the memory of the television receiver. In still other examples, the receiver 130 may transmit a combination of program listings with identifying data for some television programs, and actual television content (e.g., audio/video files) for other television programs. The determinations of television content to back up in such examples may be based on program size (e.g., for programs less than a particular size threshold, the actual program content may be backed up, etc.), program source/channels (e.g., for programs from particular subsets of television data sources 140 and/or television channels, the actual program content may be backed up, etc.), program availability (e.g., for paid programs and/or programs not readily available from later downloading, the actual program content may be backed up, etc.).

Figure 5:
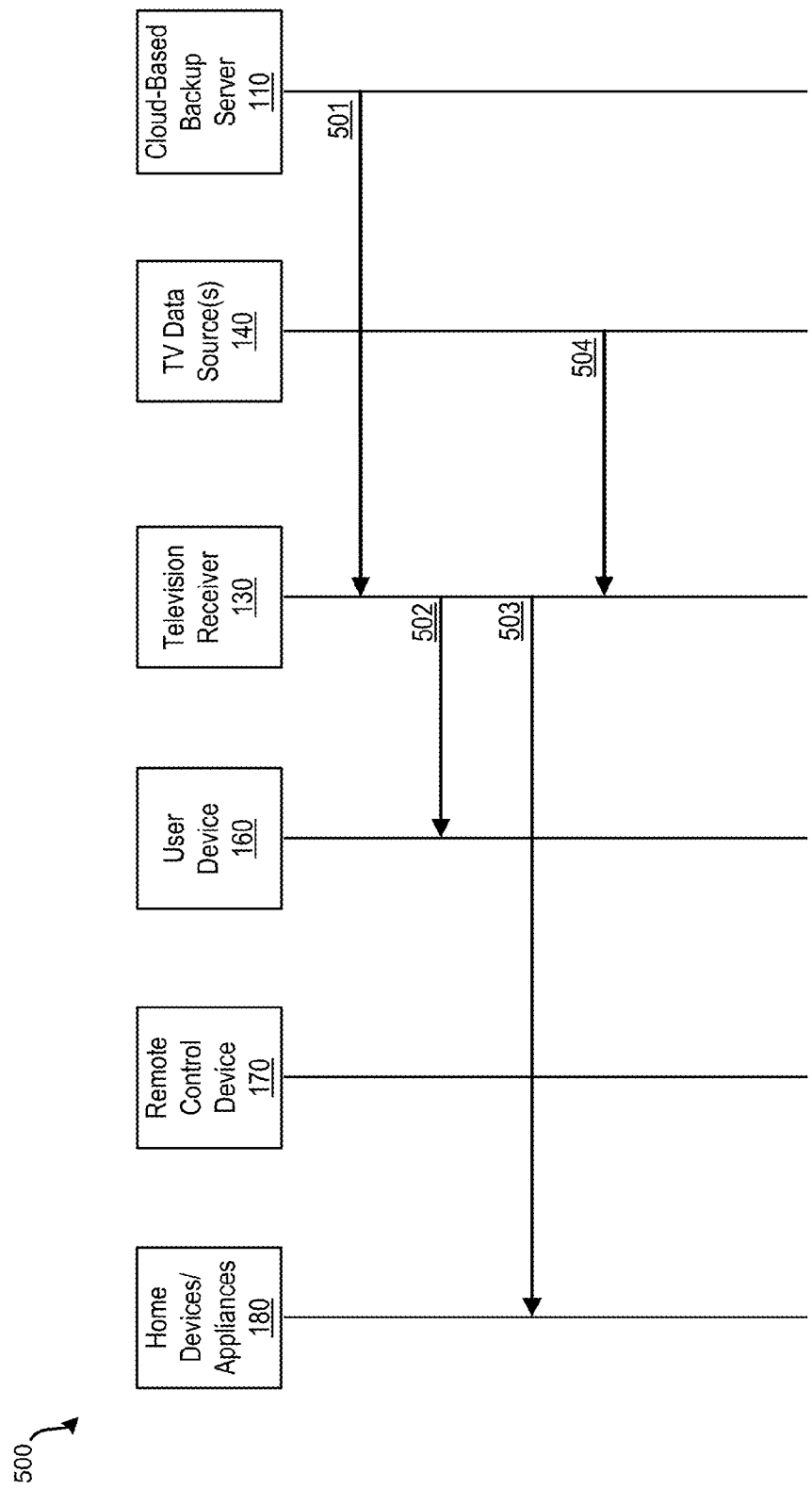
FIG. 5 is an example sequence diagram illustrating a process of television receiver data restoration, according to one or more embodiments of the disclosure.

Referring now to FIG. 5, another sequence diagram is shown illustrating an example process of retrieving backup data from a cloud-based backup server 110 and using the backup data to restore (or set-up) a television receiver 130. In some cases, process 500 may be a continuation of the backup process 400 discussed above. For example, the backup process 400 may be performed one or more times during the operational lifecycle of a television receiver device 130. For instance, a television receiver 130 may continuously collect data in steps 401-404, and then transmit backup data to the backup server 110 (step 405), either periodically or in response to specific triggering events such as receiver device errors or warnings, before software upgrades, receiver reboots, etc. Then, in the event of a serious error or device failure of the receiver 130, the restoration process 500 may be performed during a rebuild, reinstallation, or data recovery process for the same television receiver 130 from which the backup data was transmitted, or as part of a set-up and installation process performed on a new replacement television receiver 130.

In step 501, the television receiver 130 may receive various backup data from one or more backup servers 110. As noted above, although this example shows a cloud-based backup server 110, in other examples, backup servers 110 may be implemented within web servers, computer servers of television service providers, third-party backup storage services, and/or local backup devices (e.g., home personal computer backup, external storage drive), etc. In some embodiments, the receiver 130 may transmit a backup data request and/or authentication credentials to the backup server 110 in step 501, in order to receive the backup data. For instance, a network address (e.g., IP address) and/or other backup server identifier data may be hardwired or hardcoded into the television receiver 130. During the restoration process 500 (e.g., new device set-up, existing device rebuild or data recovery etc.), the receiver 130 may be configured to automatically contact the backup server using the preprogrammed network address, and to transmit one or more identifiers associated with the receiver 130, such as a receiver serial number, MAC address, account number, etc., from which the backup server 110 can determine and retrieve the appropriate set of backup data.

In some embodiments, the receiver 130 and/or backup server 110 may implement various authentication and security features before permitting the television receiver backup data to be downloaded in step 501. As noted above, the backup data may include secure, private, and confidential data in some cases, such as home security system settings, home monitoring data, television program recording timer data, user favorites and preferences, restricted television viewing passcodes, parental control settings, etc. Accordingly, in some implementations, the backup server 110 may verify the receiver device identifier, MAC address, IP address, and/or user account data, to ensure that the request is not fraudulent, before transmitting the backup data to the receiver 130. Additionally or alternatively, various user authorization and authentication processes (e.g., multi-factor authentication) may be performed to verify the legitimacy of the request for backup data. Furthermore, a variety of different secure network appliances and/or secure network communication techniques and protocols may be used for transmitting backup data from the backup server 110 to the receiver 130, including but not limited to secure transmission protocols and/or specialized hardware (e.g., encryption, hardware-accelerated SSL and HTTPS, WS-Security, firewalls, etc.) for transmitting secure data.

The television receiver backup data received in step 501 may include some or all of the various backup data transmitted to the backup server 110 in step 405, discussed above. Thus, the backup data received by television receiver 130 in step 501 may include one or more of: configuration data, settings, and user preferences data (see steps 401-402), home device/appliance data (see step 403), and/or television program data (see step 404), all of which has previously been uploaded to the backup server 110 by the receiver device 130 or a related receiver device.

After receiving the backup data in step 501, the receiver 130 may extract and initiate various set-up and receiver configuration processed based on the received backup data. For example, the receiver 130 may automatically configure its various settings and preferences in accordance with the settings and preferences received in step 501. The receiver 130 may create various digital video recorder (DVR) program recording timers, program viewing preferences, and set-up favorite channel lists based on the backup data received in step 501. The receiver 130 also may create (or re-create) security passcodes for restricted channels or restricted content types, parental control rules, time-based, content-based, and/or channel-based viewing restrictions, and the like. In some cases, these configurations may be performed automatically by the television receiver 130, so that existing receivers 130 may be rebuilt or restored, and new receivers may be set-up, to identically match the functionality of the television receiver 130 backed-up in process 400.

Additionally, as illustrated in FIG. 5, the receiver 130 may communicate with other devices 140, 160, and 180, during and/or after the configuring the receiver 130 in step 501. In step 502, the receiver 130 may communicate with one or more user devices 160. For example, the communications in step 502 may include authorization and/or confirmation messages transmitted from the receiver 130 to the user device 160 to request approval for and/or confirm the configurations of the receiver 130 described above. Additionally, in some cases, various types of television receiver functionality may include client-side applications or settings, such as client passcodes for securing access to restricted channels, setting parental controls, uploads of home security/monitoring data, uploads of EPG or DVR data, etc. In these cases and other such examples, the communications in step 502 may include the receiver 130 transmitting the appropriate client-side applications, data, and/or settings to user device(s) 160, based on the backup data received in step 501 and subsequent configurations performed at the receiver 130. Similarly, in step 503, the receiver 130 may transmit configuration data to home appliances/devices 180 based on the backup data received in step 501. The configuration data transmitted in step 503 may include, for example, instructions to activate/deactivate and configure various devices 180, in accordance with the backup data received in step 501. Thus, for any device/appliance configuration settings not stored or persisted on the devices 180 themselves, or for device/appliance configuration settings that were lost from devices 180 during the failure or restoration of the receiver 130, the data transmitted in step 503 may restore those configuration settings to devices 180 as well. As another example, the configuration data transmitted in step 503 may include wireless network data (e.g., network identifiers, addresses, credentials, etc.) received from the backup server 110 in step 501, which the receiver 130 may use to establish a connection with one or more wireless networks at or near the receiver's location. For instance, the receiver 130 may use the wireless network data to locate, connect, and authenticate to wireless router(s) and/or other network appliances 180 during a receiver set-up process, and may established such connections automatically and not in response to any express user command.

As discussed above in step 405, in some cases television receiver backup data may include actual television program content (e.g., audio/video files, etc.), and in other cases the backup data might only include data identifying the television programs that were previously stored by the receiver 130 rather than transmitting the television programs themselves. Thus, the backup data received in step 501 may include television content, program listings, or a combination of television content and program listings.

In step 504, for any program listings received by the receiver 130 in step 501, the receiver 130 may use the program listings to determine specific television programs to be restored onto the receiver 130, and may request and receive the specific television programs from television data sources 140. As discussed below in more detail in reference to FIG. 6, in some cases the television receiver 130 may analyze the electronic program guide (EPG) data to determine upcoming television broadcasts of the television programs in the program listings. Additionally or alternatively, the television receiver 130 may use data source identifiers and/or network address information, along with program titles or other identifying information, to request and retrieve the program content from one or more television data sources 140. The retrieval of television program content in step 504 may be initiated automatically by the television receiver 130, for example, during a rebuild, reinstallation, or data recovery process for the same television receiver 130 from which the backup data was transmitted, or as part of a set-up and installation process performed on a new replacement television receiver 130. In some cases, the retrieval of television program content may be completed entirely automatically, while in other cases the receiver 130 may generate user interfaces to allow the user to confirm the restoration of television program content and/or to select specific programs to be retrieved.

Figure 6:
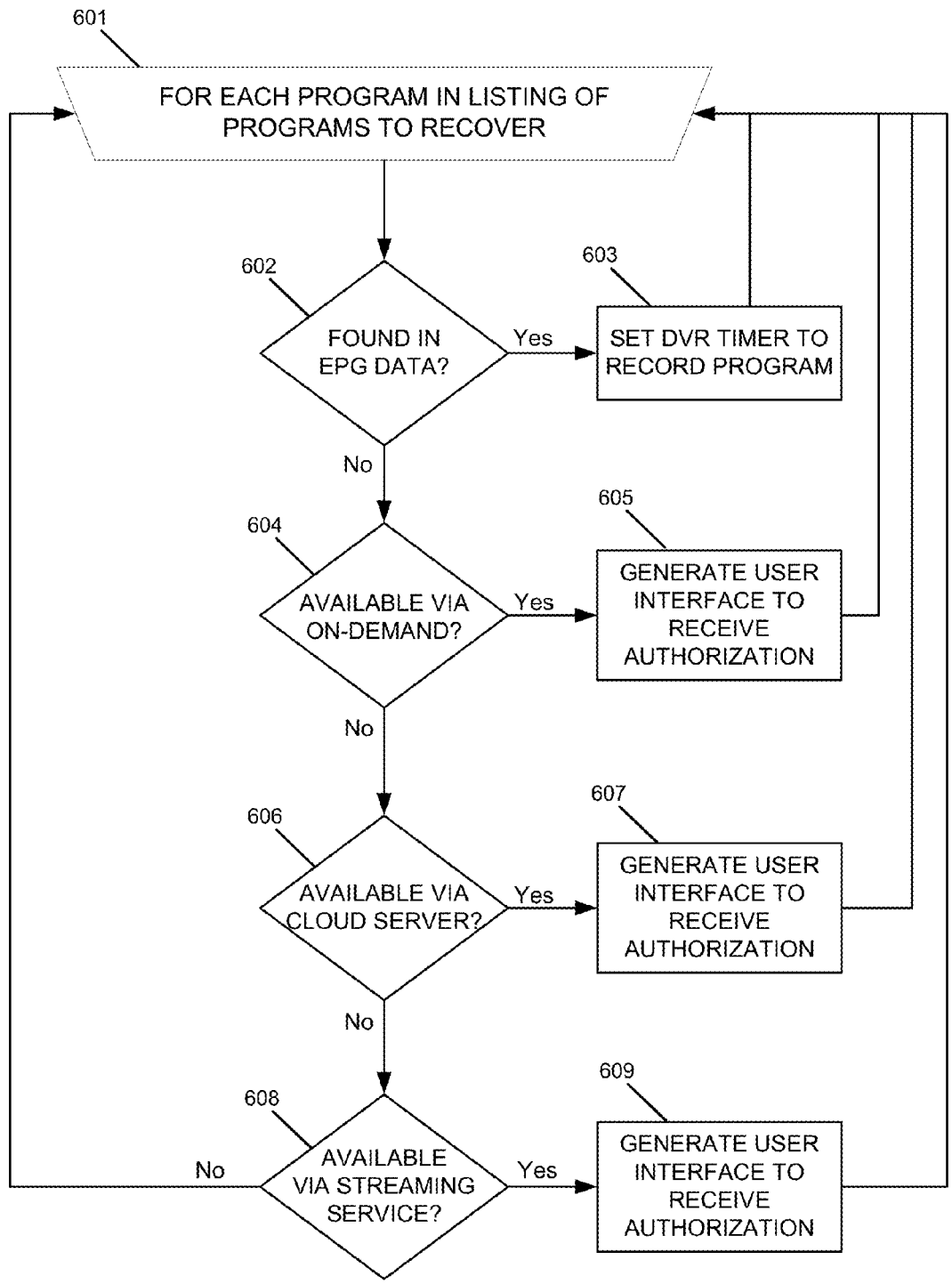
FIG. 6 is a flow diagram illustrating an example process of recovering television programs from a plurality of television data sources, according to one or more embodiments of the disclosure.

Referring now to FIG. 6, a flow diagram is shown illustrating an example process of recovering television programs onto a television receiver 130 from a plurality of television data sources 140. The process shown in FIG. 6 (and/or the variations of this example process described below) may be performed by a receiver 130 using a set of program listings, such as the program listing data uploaded to backup servers 110 in step 405 and then received by television receivers 130 in step 501. As discussed above, such program listings may be received by television receivers 130, instead of receiving actual television content from backup server 110, during a set-up and installation process for a new replacement television receiver 130, or during a rebuild, reinstallation, or data recovery process for an existing television receiver 130.

As indicated in step 601, the subsequent steps 602-609 in this process may be performed for each television program in a listing of programs to that a television receiver 130 will attempt to restore/recover following a device failure, rebuild, or other set-up process. The program listing may include various types of identifying data for each television program to be recovered, including, for example, the program name, the program identifier, the data source from which the program was originally received, the channel on which the program was originally broadcasted, the program duration, the program size, etc.

In step 602, the television receiver 130 may compare the identifying data for a particular television program in the program listing, to the electronic programming guide (EPG) data for upcoming television broadcasts that are available to the receiver 130. In some cases, the receiver 130 may compare program titles, descriptions, channels, durations, and/or other identifying information, to determine whether the particular program is going to be aired in an upcoming television broadcast. The EPG data analyzed by the receiver 130 in step 602 may include EPGs of a single television data source 140, or EPGs from multiple television data sources 140. For example, the television receiver 130 may receive EPG data from a satellite television provider 141, and separate EPG data from a cable television provider 142, etc.

If the EPG data indicates that the particular program is going to be aired in an upcoming broadcast (602:Yes), then in step 403 the receiver 130 may create a program recording timer for the correct time, channel, and duration, to record the program. Thus, television programs may be automatically restored/recovered by the receiver 130, by identifying upcoming broadcasts of the programs within the EPG and setting the appropriate timers. Additionally, programs may be recovered from a particular television data source 140 based on EPG data in steps 602-603, even if those programs were originally obtained (e.g., in step 404) using different techniques and/or from different data sources 140. For instance, a television program originally transmitted to a receiver 130 (in step 404) from an on-demand or Internet-based television data source 143 or 144, may be recovered in steps 602-603 based on EPG data from a satellite or cable television data source 141 or 142, or vice versa.

Figure 7:
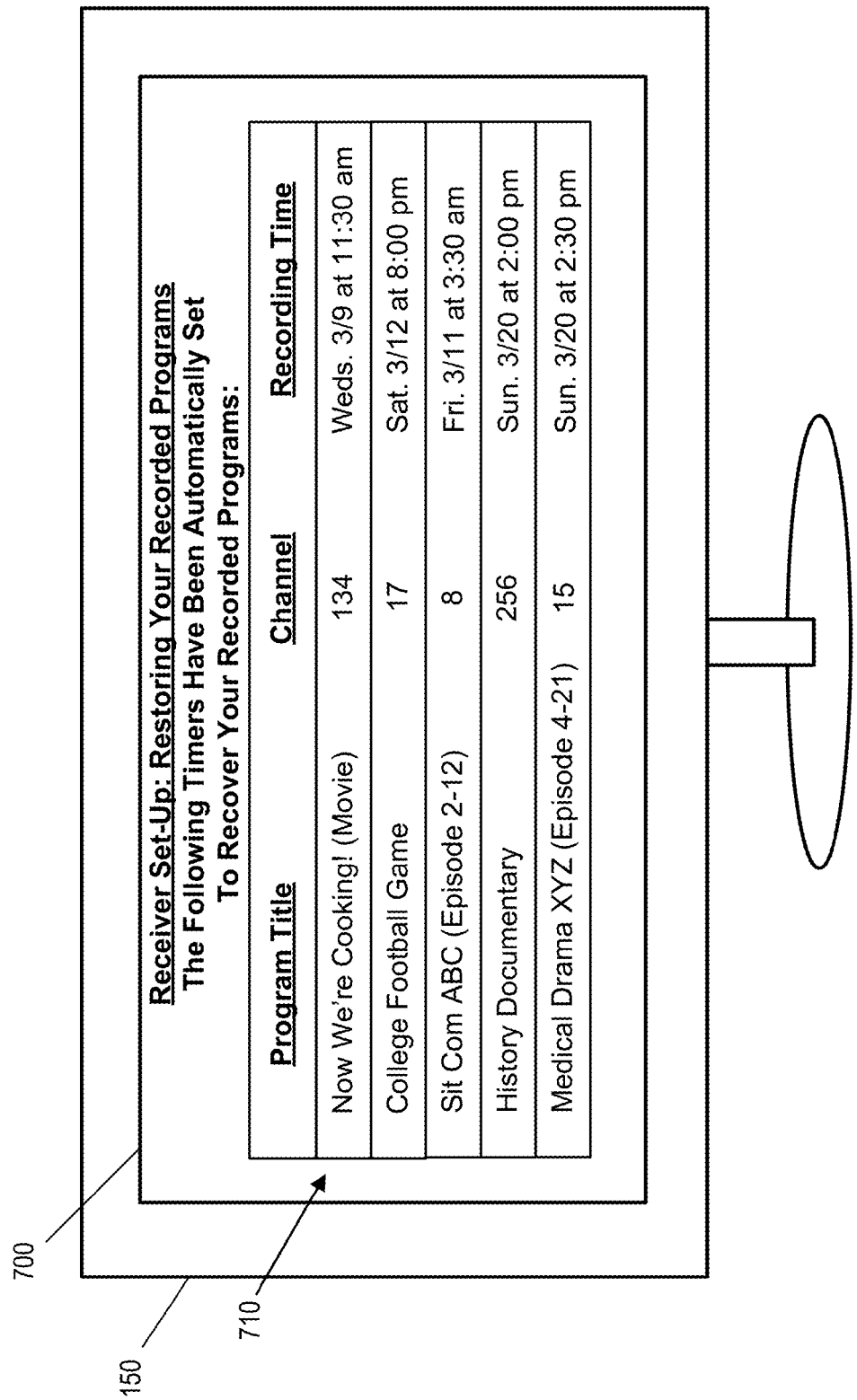

Referring briefly to FIG. 7, an example user interface screen 700 is shown displayed on a presentation device 150. As indicated on the screen 700, this example includes a list 710 of program recording timers that have been automatically set in steps 602-603, in order to recover and store the television programs during the receiver set-up process (e.g., rebuild, reinstallation, data recovery, or new receiver installation and set-up). As noted above, the data sources 140, channels, and/or broadcast times in the recording timer list 710 need not be the same as the data sources 140, channels, and broadcast times from which the programs were originally received and stored in step 404, before the device failure/error/rebuild/etc.

Returning to FIG. 6, for any program not found within the EPG data received and analyzed by the receiver 130 (602:No), the receiver may attempt to retrieve the program from one or more other television data sources 140. For instance, in this example, the television receiver 130 next determines in step 604 whether the program is currently available from an on-demand television sources/distribution network 144. If the program is available on-demand (604:Yes), then the receiver 130 in step 605 may generate and present a user interface that allows a user of the receiver 130 to request and/or authorize the retrieval of the program via the on demand data source 144. If the program is not currently available on-demand (604:No), then the receiver 130 next determines in step 606 whether the program is currently available for download from a cloud server or other Internet-based television provider 143. If the program is available from the cloud server or Internet-based provider (606:Yes), then the receiver 130 in step 607 may generate and present a user interface that allows the user to request and/or authorize the retrieval of the program via the cloud server or Internet-based provider. Finally, in this example, if the program is not currently available from the cloud server or other Internet based provider 143 (606:No), then the receiver 130 next determines in step 608 whether the program is currently available for download from a streaming media service. If the program is available from the streaming media service (608:Yes), then the receiver 130 in step 609 may generate and present a user interface that allows the user to request and/or authorize the retrieval of the program via the streaming media service. If the program is not available from the streaming media service (608:No), then, in this example, the receiver 130 may determine that the program cannot be recovered at this time. In other cases, the receiver 130 may attempt to obtain the program from one or more additional data sources 140, if available.

In this example, the receiver 130 attempts to retrieve each program not identified within the EPG data, from three different television sources, an on-demand provider (steps 604-605), a cloud server (steps 606-607), and a streaming service (steps 608-609). However, it should be understood that in different embodiments, the receiver 130 may attempt to retrieve the programs from different television data sources and/or in different orders than the order shown in FIG. 6. Additionally, in this example, the receiver 130 may be configured to automatically set recording timers for retrieving programs in step 603, but may generate and present user interfaces before retrieving programs from other data sources in steps 605, 607, and 609. However, in other examples, the receiver 130 might not automatically set program timers in step 603, but instead may present a user interface to receive express user confirmation or user authorization credentials before setting the program timers in step 603. Additionally, other examples, the receiver 130 may be configured to automatically request/retrieve the programs from various data sources 140, without requiring express user confirmation or authorization, and thus might not generate and present user interfaces in steps 605, 607, and 609.

In some cases, the receiver 130 may determine that user interfaces should be generated and presented in steps 605, 607, and 609, based on a determination that a cost will be associated with recovering these particular program(s). For example, certain television data sources 140 (e.g., Internet-based providers 143, on-demand providers 144, etc.) may charge fees for program downloads, and streaming services may charge fees for program streaming. Different resources may have different downloading/streaming costs at different times, and from different data sources 140. In addition to such fees, the costs of downloading/streaming programs may include various costs associated with the network usage required to recover the program (e.g., network usage fees or overage fees on various types of communication networks 115), or costs associated with a media content subscription (e.g., a streaming media service that permits N streaming downloads per day/week/month). Additionally, storage space within the DVR database 316 or other memory system within the receiver 130 may be a potential concern, for example, if a new replacement receiver 130 contains less available storage than the failed receiver 130 it is replacing. Accordingly, in some cases, the receiver 130 may be configured to generate and present a user interface before recovering any programs from particular data sources 140. In other cases, the receiver 130 may be configured to generate and present a user interface only for particular program recoveries having an associated fee or other cost (e.g., greater than a downloading/streaming fee threshold, greater than a percentage of weekly/monthly network usage, etc.).

Referring briefly to FIG. 8, another example user interface screen 800 is shown displayed on a presentation device 150. As indicated on the screen 800, this example includes several programs 810 within the listing of programs to be recovered as part of a receiver set-up process (e.g., rebuild, reinstallation, data recovery, or new receiver installation and set-up), which are available from an on-demand television provider, cloud server, or a streaming media service. Thus, the user interface in this example may correspond to the user interface generated and presented by the receiver 130 based on steps 604-609 in the above example. As shown in this example, each program immediately available to the receiver 130, either for downloading into the DVR database 316 or for streaming and immediate viewing, is presented to the user for selection, along with the associated fees for downloading/streaming. In some embodiments, depending on the circumstances and reasons for the program recovery (e.g., receiver device failure and return authorization of a previous device, receiver error and diagnostic test on current device, software upgrade, etc.) the associated fees/costs of program recovery may be discounted or waived. For example, the receiver 130 may be configured to transmit data indicating that the receiver 130 is executing a set-up/program recovery process (and/or the circumstances and reasons for the program recovery) to the various data sources 140, and the data sources 140 may respond may lowering or waiving the associated fees or costs.

Figure 9:
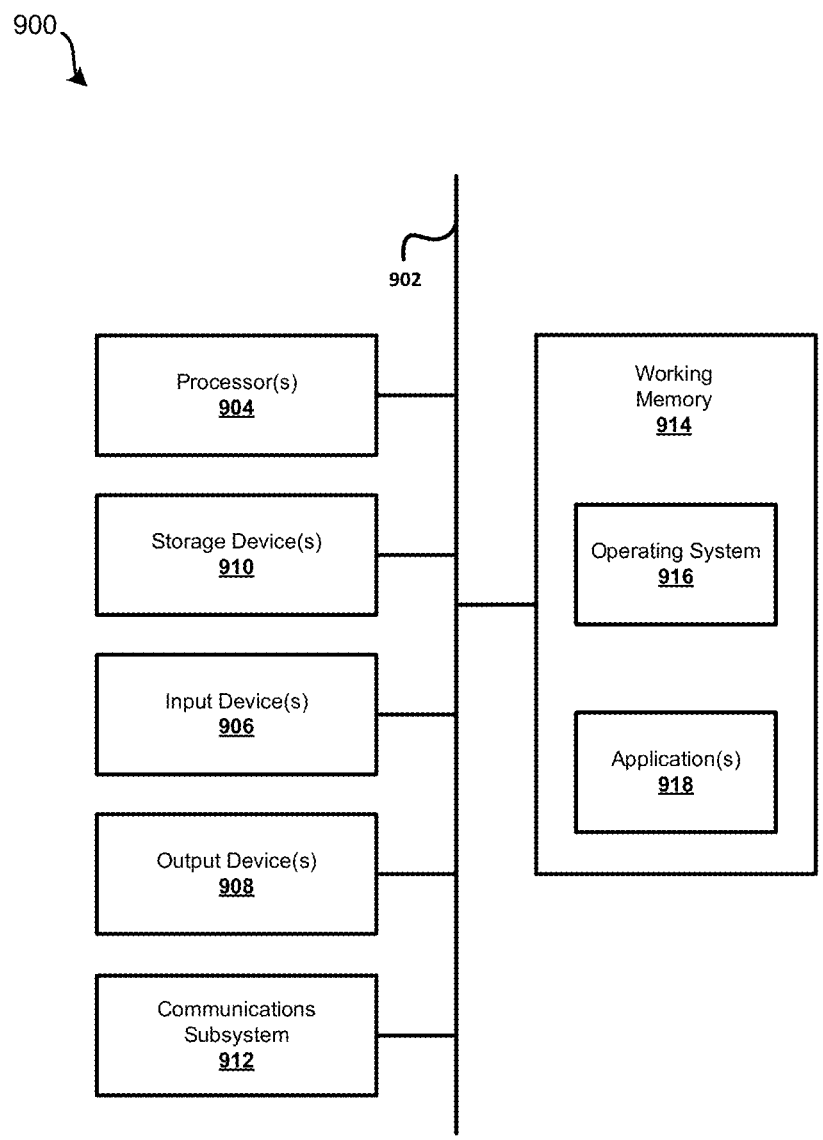
FIG. 9 is a block diagram illustrating an example computing system upon which various features of the present disclosure may be implemented.

Referring now to FIG. 9, an example is shown of a computer system or device 900 in accordance with the disclosure. Examples of computer systems or devices 900 may include systems, controllers, monitors, or the like, an enterprise server, blade server, desktop computer, laptop computer, tablet computer, personal data assistant, smartphone, gaming console, set-top box, television receiver, "smart" home automation-related sensor or device or system or controller or monitor or detector, and/or any other type of machine configured for performing calculations. Any particular one of the previously-described computing devices may be wholly or at least partially configured to exhibit features similar to the computer system 900, such as any of the respective elements or components of at least FIGS. 1-5. In this manner, any of one or more of the respective elements of those figures may be configured and/or arranged, wholly or at least partially, for implementing television receiver backup and restoration functionality as discussed above. Still further, any of one or more of the respective elements of at least FIGS. 1-5 may be configured and/or arranged to include computer-readable instructions that, when executed, instantiate and implement various functionality described herein (e.g., one or more receiver backup/restoration engines 120 and/or services 220).

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the disclosure. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904. It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver device, comprising:
    one or more tuners configured to receive television signals from one or more television data sources;
    one or more decoders configured to decode television signals received via the one or more tuners;
    a digital video recorder (DVR) comprising a DVR database configured to receive and store recorded television programs
    one or more processors; and
    memory communicatively coupled with and readable by the one or more processors and having stored therein processor-readable instructions which, when executed by the one or more processors, cause the television receiver device to:
        receive, from a backup server operating separately and at a remote location from the television receiver device, television receiver backup data, the television receiver backup data including a listing of television program data identifying one or more television programs to be restored to the television receiver device;
        receive electronic programming guide (EPG) data corresponding to a plurality of upcoming television program broadcasts from one or more television data sources;
        determine whether at least one of the television programs to be restored to the television receiver device is identified within the received EPG data corresponding to the plurality of upcoming television program broadcasts, using the listing of television program data received from the backup server;
        in response to determining that at least one television program to be restored to the television receiver device is identified within the received EPG data, set one or more timers on the television receiver device to record the identified at least one television program, based on the EPG data;
        receive the identified at least one television program via the one or more television data sources; and
        record and store the identified at least one television program in the DVR database of the digital video recorder.

2. The television receiver device of claim 1, wherein the receiving of the television receiver backup data from the backup server, the determining whether at least one of the television programs to be restored to the television receiver device is identified within the EPG data, and the setting of timers on the television receiver device are performed automatically during a set-up process of the television receiver device, and not in response to express user commands.

3. The television receiver device of claim 1, wherein receiving the television receiver backup data comprises:
    automatically initiating a communication session with the backup server during a receiver set-up process, wherein the backup server is a cloud-based backup server of a television service provider;
    transmitting a unique identifier of the television receiver device to the cloud-based backup server; and
    retrieving the television receiver backup data from the cloud-based backup server in response to a verification of the unique identifier.

4. The television receiver device of claim 1, the memory having stored therein further processor-readable instructions which, when executed by the one or more processors, cause the television receiver device to:
    in response to determining that at least one additional television program to be restored to the television receiver device is not identified within the received EPG data:
        (a) determine that the at least one additional television program to be restored to the television receiver device is accessible to the television receiver device via a video on-demand television service;
        (b) in response to determining that the at least one additional television program to be restored to the television receiver device is accessible via the video on-demand television service, request the at least one additional television program via the video on-demand television service; and
        (c) record and store the at least one additional television program in the DVR database of the digital video recorder.

5. The television receiver device of claim 4, the memory having stored therein further processor-readable instructions which, when executed by the one or more processors, cause the television receiver device to:

determine a cost associated with the request for the at least one additional television program via the video on-demand television service;

output a user interface including the cost to a display device associated with the television receiver device; and receive user input via the user interface corresponding to a command to request the at least one additional television program via the video on-demand television service.

6. The television receiver device of claim 1, the memory having stored therein further processor-readable instructions which, when executed by the one or more processors, cause the television receiver device to:

in response to determining that at least one additional television program to be restored to the television receiver device is not identified within the received EPG data:

(a) determine that the at least one additional television program to be restored to the television receiver device is accessible to the television receiver device from an Internet television data source via a network interface;

(b) in response to determining that the at least one additional television program to be restored to the television receiver device is accessible from the Internet television data source, request the at least one additional television program from the Internet television data source; and (c) record and store the at least one additional television program in the DVR database of the digital video recorder.

7. The television receiver device of claim 6, the memory having stored therein further processor-readable instructions which, when executed by the one or more processors, cause the television receiver device to:

determine a cost associated with the request for the at least one additional television program via the Internet television data source;

output a user interface including the cost to a display device associated with the television receiver device; and receive user input via the user interface corresponding to a command to request the at least one additional television program from the Internet television data source.

8. The television receiver device of claim 1, wherein the television receiver backup data is received from the remote backup server during a receiver set-up process, and wherein the television receiver backup data received from the remote backup server includes network access credentials identifying one or more wireless networks available for connection by the television receiver device, and wherein the television receiver device is further configured to:

establish a connection with the one or more wireless networks using the network access credentials, wherein the connection is established automatically during the receiver set-up process and not in response to an express user command.

9. The television receiver device of claim 1, wherein the television receiver backup data is received from the remote backup server during a receiver set-up process, the television receiver backup data received from the remote backup server comprises one or more parental control configuration settings associated with the television receiver device, and wherein the television receiver device is further configured to:

apply the parental control configuration settings on the television receiver device, wherein the parental control configuration settings are applied automatically during the receiver set-up process and not in response to an express user command.

10. The television receiver device of claim 1, wherein the television receiver backup data is received from the remote backup server during a receiver set-up process, the television receiver backup data received from the remote backup server comprises one or more home automation device control settings associated with the television receiver device, and wherein the television receiver device is further configured to:

apply the home automation device control settings on the television receiver device, wherein the home automation device control settings are applied automatically during the receiver set-up process and not in response to an express user command.

11. A method, comprising:

receiving, by a television receiver device, from a backup server operating separately and at a remote location from the television receiver device, television receiver backup data including a listing of television program data identifying one or more television programs to be restored to the television receiver device;

receiving, by the television receiver device, electronic programming guide (EPG) data corresponding to a plurality of upcoming television program broadcasts from one or more television data sources;

determining, by the television receiver device, whether at least one of the television programs to be restored to the television receiver device is identified within the received EPG data corresponding to the plurality of upcoming television program broadcasts, using the listing of television program data received from the backup server;

in response to determining that at least one television program to be restored to the television receiver device is identified within the received EPG data, setting, by the television receiver device, one or more timers on the television receiver device to record the identified at least one television program, based on the EPG data;

receiving, by the television receiver device, the identified at least one television program via the one or more television data sources; and recording and storing, by the television receiver device, the identified at least one television program in a digital video recorder (DVR) database of the television receiver device.

12. The method of claim 11, wherein the receiving of the television receiver backup data from the backup server, the determining whether at least one of the television programs to be restored to the television receiver device is identified within the EPG data, and the setting of timers on the television receiver device are performed automatically during a set-up process of the television receiver device, and not in response to express user commands.

13. The method of claim 11, wherein receiving the television receiver backup data comprises:

automatically initiating a communication session with the backup server during a receiver set-up process, wherein the backup server is a cloud-based backup server of a television service provider;

transmitting a unique identifier of the television receiver device to the cloud-based backup server; and retrieving the television receiver backup data from the cloud-based backup server in response to a verification of the unique identifier.

14. The method of claim 11, further comprising:
in response to determining that at least one additional television program to be restored to the television receiver device is not identified within the received EPG data:
(a) determining that the at least one additional television program to be restored to the television receiver device is accessible to the television receiver device via a video on-demand television service;
(b) in response to determining that the at least one additional television program to be restored to the television receiver device is accessible via the video on-demand television service, requesting the at least one additional television program via the video on-demand television service; and
(c) recording and storing the at least one additional television program in the digital video recorder (DVR) database.

15. The method of claim 14, further comprising:
determining a cost associated with the request for the at least one additional television program via the video on-demand television service;
outputting a user interface including the cost to a display device associated with the television receiver device; and
receiving user input via the user interface corresponding to a command to request the at least one additional television program via the video on-demand television service.

16. The method of claim 11, further comprising:
in response to determining that at least one additional television program to be restored to the television receiver device is not identified within the received EPG data:
(a) determining that the at least one additional television program to be restored to the television receiver device is accessible to the television receiver device from an Internet television data source via a network interface;
(b) in response to determining that the at least one additional television program to be restored to the television receiver device is accessible from the Internet television data source, requesting the at least one additional television program from the Internet television data source; and
(c) recording and storing the at least one additional television program in the digital video recorder (DVR) database.

17. The method of claim 16, further comprising:
determining a cost associated with the request for the at least one additional television program via the Internet television data source;
outputting a user interface including the cost to a display device associated with the television receiver device; and
receiving user input via the user interface corresponding to a command to request the at least one additional television program from the Internet television data source.

18. The method of claim 11, wherein the television receiver backup data is received from the remote backup server during a receiver set-up process, and wherein the television receiver backup data received from the remote backup server includes network access credentials identifying one or more wireless networks available for connection by the television receiver device, and wherein the method further comprises:
establishing a connection with the one or more wireless networks using the network access credentials, wherein the connection is established automatically during the receiver set-up process and not in response to an express user command.

19. The method of claim 11, wherein the television receiver backup data is received from the remote backup server during a receiver set-up process, the television receiver backup data received from the remote backup server comprises one or more parental control configuration settings associated with the television receiver device, and wherein the method further comprises:
applying the parental control configuration settings on the television receiver device, wherein the parental control configuration settings are applied automatically during the receiver set-up process and not in response to an express user command.

20. The method of claim 11, wherein the television receiver backup data is received from the remote backup server during a receiver set-up process, the television receiver backup data received from the remote backup server comprises one or more home automation device control settings associated with the television receiver device, and wherein the method further comprises:
applying the home automation device control settings on the television receiver device, wherein the home automation device control settings are applied automatically during the receiver set-up process and not in response to an express user command.

* * * * *